Sept. 11, 1934.  H. L. SKLAR  1,973,544
CONDENSER
Filed Sept. 30, 1932
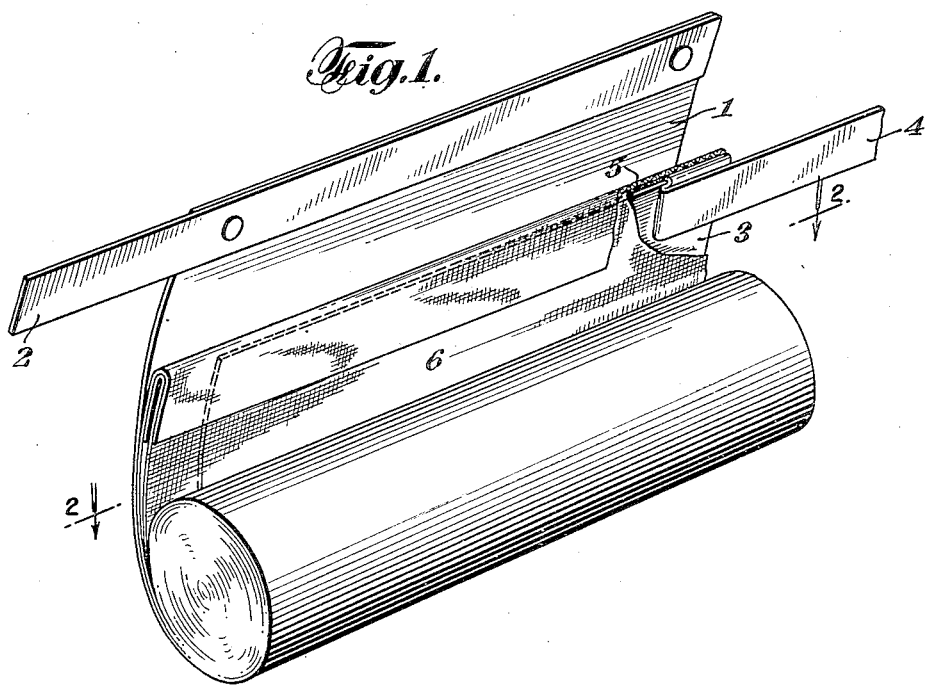
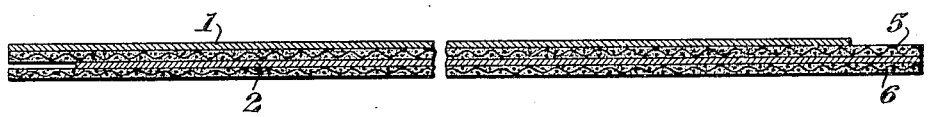
INVENTOR
Herman Lee Sklar
BY
ATTORNEYS Patented Sept. 11, 1934

1,973,544

UNITED STATES PATENT OFFICE 1,973,544

CONDENSER

Herman Lee Sklar, Coney Island, N. Y., assignor to Micamold Radio Corporation, Brooklyn, N. Y., a corporation of New York Application September 30, 1932, Serial No. 635,611

5 Claims. (Cl. 175—315)

This invention relates to condensers of the type wherein a dry electrolytic film is maintained on the surface of armatures or electrodes such as aluminum and employing an electrolyte in the form of a heavy liquid.

I have found that an improved condenser of this type may be made employing an ethanol substituted derivative of ammonia-monoethanolamine in combination with boric acid hexamethylenetetramine, and glycol or similar substance, that is, compounds having adjacent pairs of carbon atoms, together with the addition of a protective colloid such as starch or bentonite.

As an example of the electrolyte I mix the following ingredients in the proportions indicated:

| | Parts by weight |
|---|---|
| Monoethanolamine | 1 |
| Glycol | 5 |
| Boric acid | 5 |
| Hexamethylenetetramine | 0.11 |
| Starch | .07 |
| Monoethanolamine | $NH_2(CH_2)_2OH$ |
| Glycol | $CH_2OH.CH_2OH$ |
| Boric acid | $H_3BO_3$ |
| Hexamethylenetetramine | $C_6H_{12}N_4$ |

This mixture is heated to boiling and the boiling is continued to a temperature between 125 degrees and 130 degrees C. in order to drive off part of the water originally present and that liberated by the reaction within the electrolyte. When this temperature is reached I submerge the electrolytic condenser rolls of the type well known to the art in the prepared electrolyte. The rolled condenser mentioned is formed from an aluminum anode, the surface of which is covered with gauze. Under this is placed a raw aluminum cathode covered with gauze and the two are rolled up. It is such a condenser roll which is dipped into the electrolyte and impregnated therewith. The condenser is then formed in a manner well known to the art, that is by applying a high voltage to the condenser in series with a high resistance.

Although I have specifically described an electrolyte containing the parts by weight mentioned above, it is to be understood that I am not confined to such proportions, but may vary the ingredients to obtain different characteristics in the condenser. It is also to be noted that although I have described specifically the use of monoethanolamine, I have found that this material may be employed with triethanolamine or other highly substituted alcoholamine as part of the electrolyte yielding an electrolyte of higher viscosity.

In general the use of monoethanolamine is preferred because the ethanolammonium ion is smaller than the triethanolammonium ion and accordingly associates fewer molecules with it in solution. Its ionic mobility consequently suffers but little change when the temperature lowers and therefore changes in temperature have but limited effect on the power factor and capacity of a condenser employing monoethanolamine.

Although, as above, I have described the use of boric acid it is to be noted that monoethanolamine in combination with hexamethylenetetramine may be used with other suitable weak acids. Among such suitable acids are glyco boric and glycero boric acids.

It is to be noted that after prolonged use for impregnation if the electrolyte loses efficiency through the loss of too much water, water may be added to the electrolyte to bring it back to its original consistency.

I have found that condensers so prepared and formed give a large capacity per square inch and an extremely low power factor. They also have an improved shelf life characteristic. I have found also that the condenser described above is highly efficient at low temperature.

A preferred form of condenser employing the electrolyte above described is shown in the accompanying drawing wherein Fig. 1 is a perspective view of the condenser partially unrolled, and Fig. 2 is an enlarged cross-sectional view taken through the condenser along the line 2—2 of Fig. 1.

In the drawing, the numeral 1 designates one electrode with its terminal 2. The other electrode is designated by 3 with its terminal shown at 4. Between the electrodes are layers of gauze 5 and 6 impregnated with the electrolyte.

What I claim is:

1. An electrolytic condenser of the class described having an armature of the film-forming type and an electrolyte characterized by the presence of an ethanolammonium ion, hexamethylenetetramine, a weak acid and a polyhydroxy alcohol.

2. An electrolytic condenser of the class described having an armature of the film-forming type and an electrolyte characterized by the presence of a monoethanolamine, hexamethylenetetramine, a weak acid and a polyhydroxy alcohol.

3. An electrolytic condenser of the class described having an armature of the film-forming type and an electrolyte characterized by the presence of an ethanolammonium ion, hexamethylenetetramine, boric acid and a polyhydroxy alcohol.

4. An electrolytic condenser of the class described having an armature of the film-forming type and an electrolyte characterized by the presence of an ethanolammonium ion, hexamethylenetetramine, a weak acid and glycol.

5. An electrolytic condenser of the class described having an armature of the film-forming type and an electrolyte composed of glycol, monoethanolamine, boric acid, hexamethylenetetramine and a protective colloid.

HERMAN LEE SKLAR.